United States Patent [19]
Marinus et al.

[11] Patent Number: 5,418,702
[45] Date of Patent: May 23, 1995

[54] SWITCH MODE POWER SUPPLY WITH BJT/MOSFET CASCODE CIRCUIT

[75] Inventors: Antonius A. M. Marinus; Henricus C. J. Büthker, both of Eindhoven, Netherlands

[73] Assignee: U.S. Philips Corporation, New York, N.Y.

[21] Appl. No.: 285,620

[22] Filed: Aug. 3, 1994

Related U.S. Application Data

[63] Continuation of Ser. No. 174,903, Dec. 29, 1993, abandoned.

[30] Foreign Application Priority Data

Jan. 4, 1993 [EP] European Pat. Off. ............ 93200004

[51] Int. Cl.$^6$ ..................................... H02M 3/335
[52] U.S. Cl. ....................................... 363/16; 363/131
[58] Field of Search ................ 363/16, 18, 19, 20, 363/21, 97, 131; 358/190; 315/411

[56] References Cited

U.S. PATENT DOCUMENTS

| | | | |
|---|---|---|---|
| 3,896,367 | 7/1975 | Frantz | 323/351 |
| 3,925,717 | 12/1975 | Kinnard | 321/2 |
| 4,709,321 | 11/1987 | Trantham | 363/21 X |

OTHER PUBLICATIONS

V. Farrow and B. Taylor, "A 300 KHZ Off-line Switching Supply Using a Unique B-MOS Switch Combination", Powerconversion International, Sep.-/Oct., 1980. Pp. 20-27.

F. Michael Barlage, "A New Switched-mode Converter Technique Combines VMOS and Bipolar", Proceedings of Powerconversion Conference, San Francisco (4-6 May, 1978), pp. D2-1-8.

S. Clemente et al, "High Voltage, High Frequency Switching Using a Cascode Connection of Bipolar transistor and Power MOSFET", IEEE Industrial Applications, Soc. 1982, pp. 1395-1405.

*Primary Examiner*—A. D. Pellinen
*Assistant Examiner*—Y. J. Han
*Attorney, Agent, or Firm*—Laurie Gathman

[57] ABSTRACT

Switched-mode power supplies in which a series arrangement of a bipolar transistor and a MOS field effect transistor is used are known and referred to as cascode circuits. In these circuits the bipolar transistor is switched (with the MOS field effect transistor) via the emitter instead of with the base. Since the collector current of the bipolar transistor may vary over a large range, the base should be proportionally driven to prevent the bipolar transistor from getting either above or below its normal operating range. By making use of an extra winding on a transformer arranged in series with the cascode circuit, a non-dissipative proportional drive of the base of the bipolar transistor is obtained. The extra winding is coupled to the base via an inductance.

6 Claims, 2 Drawing Sheets

SWITCH MODE POWER SUPPLY WITH BJT/MOSFET CASCODE CIRCUIT

This is a continuation of application Ser. No. 08/174,903, filed Dec. 29, 1993, now abandoned.

FIELD OF THE INVENTION

The invention relates to a power supply circuit comprising input terminals for receiving an input voltage, output terminals for supplying an output voltage, a cascode circuit of a bipolar transistor and a MOS field effect transistor, the base of the bipolar transistor being driven via a proportional drive and the gate of the MOS field effect transistor being switched via a drive circuit.

BACKGROUND OF THE INVENTION

A power supply circuit of this type is known from IEEE Industrial Applications Soc. 1982, pp. 1395–1405, "High Voltage, High Frequency Switching using a cascode connection of bipolar transistor and power MOSFET". In this known power supply circuit a current transformer is used for proportionally driving the base of the bipolar transistor. The collector current is transformed down, generally five times, by means of the current transformer and is used as the base current for the bipolar transistor. Proportional drive of the base of a bipolar transistor is necessary to ensure that the base of the bipolar transistor remains within its normal operating range (i.e. the base current should not be either too large or too small) at varying collector currents. A drawback of this known power supply circuit is that the current transformer is expensive and occupies much space on the printed circuit board. A further drawback of this known power supply circuit is that the current transformer is an extra component, rendering the power supply circuit as a whole more expensive.

SUMMARY OF THE INVENTION

It is an object of the invention to provide a power supply circuit which does not have the above-mentioned drawbacks. To this end a power supply circuit according to the invention is characterized in that a primary winding of a transformer is arranged in series with the cascode circuit and the proportional drive comprises an auxiliary winding which is coupled to the primary winding, an inductance coupled to the base of the bipolar transistor being arranged in series with the auxiliary winding. It is thereby achieved that the energy in the inductance can be regained if the bipolar transistor is not switched via the base but via the emitter. By using emitter switching, also referred to as cascode connection, the energy in the coil can be fed back to the transformer.

It is to be noted that it is known per se from U.S. Pat. No. 3,925,717 to drive the base of a bipolar transistor by means of a proportional drive. However, since this switched-mode power supply circuit also receives the switch-on and switch-off drive pulse at the same base, this power supply circuit will not always be switched on and off in the correct manner. A further essential difference is that the known power supply circuit uses only bipolar transistors for switching, whereas the bipolar transistor in the power supply circuit according to the invention is switched via the emitter so that the base drive (extent of conductance) and switching on and switching off are separate from each other.

An embodiment of a power supply circuit according to the invention is characterized in that the base of the bipolar transistor is coupled to ground via a parallel arrangement of a zener diode and a capacitor.

The base of the bipolar transistor is thereby biased in such a way that the bipolar transistor, when being turned on, is driven into saturation so that there is a minimum dissipation.

An embodiment of a power supply circuit according to the invention is characterized in that the base of the bipolar transistor is coupled to ground via a parallel arrangement of a resistor and a diode in series with a voltage source.

The bipolar transistor can thereby be biased more accurately so that it is conducting in such a way that the energy dissipation is as small as possible.

An embodiment of a power supply circuit according to the invention is characterized in that the junction point of the inductance and the diode is coupled to an input terminal of the drive circuit via a second diode, said drive circuit being adapted to couple said input terminal to ground when the MOS field effect transistor is turned off.

The energy fed back from the inductance can thereby be prevented from raising the voltage at the voltage source, thus subjecting possible further loads connected to the same voltage source to a too high voltage.

BRIEF DESCRIPTION OF THE DRAWINGS

These and other aspects of the invention will be apparent from and elucidated with reference to the embodiments described hereinafter.

In the drawings.

DETAILED DESCRIPTION OF THE PREFERRED EMBODIMENTS

Figure 1:
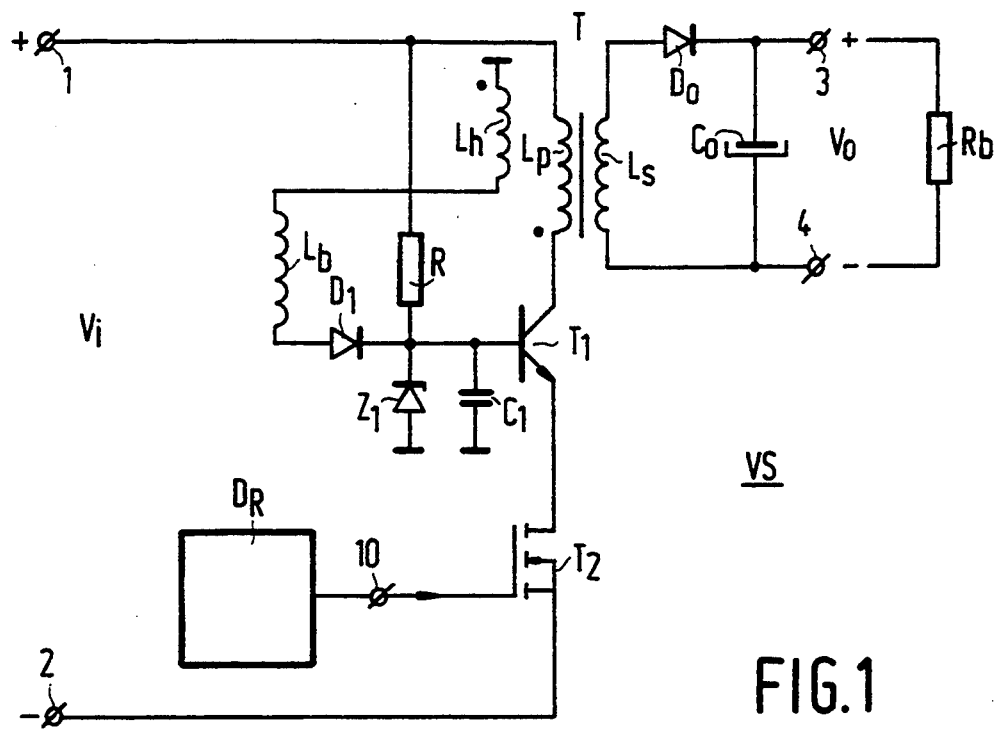
FIG. 1 shows a power supply circuit according to the invention.

FIG. 1 shows a power supply circuit VS according to the invention. The power supply circuit receives an input voltage $V_i$, for example a rectified mains voltage at input terminals 1, 2. A series arrangement of a primary winding $L_p$ of a transformer T, a bipolar junction transistor (BJT) $T_1$ and a MOSFET (field effect transistor) $T_2$ is connected between the input terminals 1, 2. A series arrangement of a diode $D_o$ and a storage capacitor $C_o$ is connected across a secondary winding $L_s$ of the transformer. Output terminals 3, 4 of the power supply circuit are connected to the respective terminals of the capacitor $C_o$. The MOSFET $T_2$ is turned on and off by means of a drive circuit $D_R$ (via an output terminal 10), for example, dependent on a load $R_b$ to be connected to the output terminals 3, 4 and/or dependent on input voltage variations. The bipolar transistor $T_1$ is a high-voltage transistor and consequently requires a special (proportional) (base) drive. In known power supply circuits this is realized by means of a current transformer, but this transformer has the drawback that it is an extra component which is expensive and also occupies much space on a printed circuit board. By providing the transformer T with an extra (primary) winding $L_h$, a proportional base drive which is not dissipative can be obtained. The auxiliary winding is connected to the base of the transistor $T_1$ via an extra coil $L_b$ and a diode $D_1$. A parallel arrangement of a zener diode $Z_1$ and a capacitor $C_1$ is connected to the base of the transistor. For the (DC) biasing of the base of the transistor $T_1$, a resistor R may also be connected between the base and the input terminal 1.

The power supply circuit operates as follows. When the cascode circuit (in this embodiment of the MOSFET $T_2$) is switched on, the collector current of the bipolar transistor $T_1$ will increase linearly with time and with the rectified mains voltage. The extra coil $L_b$ which is fed from the auxiliary winding $L_h$ is arranged in series with the base. The voltage across the coil $L_b$ is now also proportional to the power supply voltage, i.e. when the bipolar transistor $T_1$ is turned on, the current through the coil $L_b$ will increase proportionally with time and with the power supply voltage, just like the collector current in the transistor $T_1$. This is an indirect proportional drive: the collector current is not measured (as when using a current transformer) but, as it were, simulated. This is all right as long as the collector current as well as the base current start from zero. The power supply circuit is (in principle) free from losses because the energy which is stored in the extra coil $L_b$ is regained. In fact, if the bipolar transistor $T_1$ is turned off (as a result of turning off the MOSFET $T_2$), the collector voltage increases to a value above the rectified mains voltage so that the polarity of the voltage across the primary winding $L_p$ of the transformer T is reversed. The polarity of the voltage across the auxiliary winding $L_h$ will thus also be reversed. The current through the extra coil $L_b$ will now decrease. Since the product of current and voltage is now negative, energy is fed back to the transformer. When the current through the extra coil $L_b$ has become zero, the diode $D_1$ will be reverse biased. The energy which was present in the extra coil $L_b$ at the end of the period of conductance is now fully fed back to the transformer (and to the voltage source or to the capacitor $C_1$).

Figure 2A:
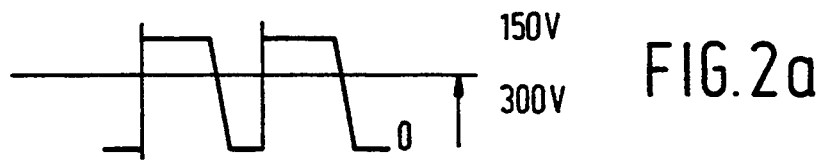
FIGS. 2a, 2b, 2c, 2d, 2e, 2f and 2g show time diagrams of voltages and currents in this power supply circuit.
Figure 2B:
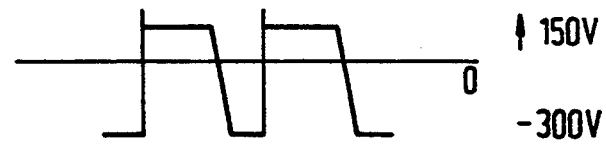
Figure 2C:
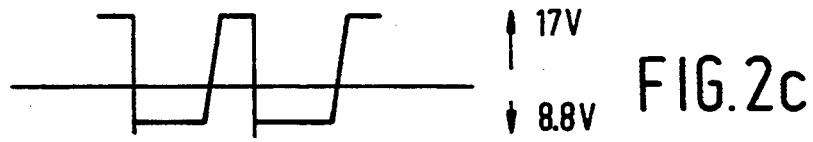
Figure 2D:
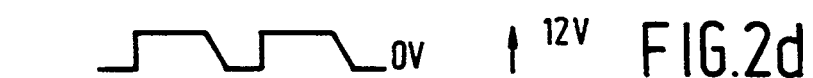
Figure 2E:
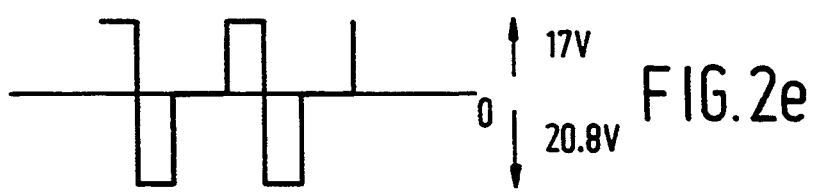
Figure 2F:
Figure 2G:
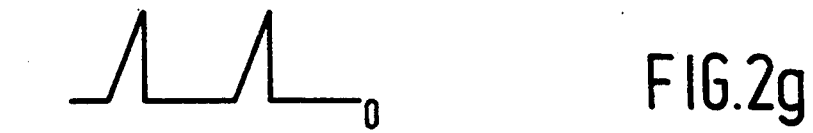

FIGS. 2a–2g show time-voltage/current diagrams to explain the operation of the power supply circuit according to the invention. FIG. 2a shows the voltage at the collector of the bipolar transistor $T_1$. FIG. 2b shows the voltage across the primary winding $L_p$ of the transformer T. FIG. 2c shows the voltage across the auxiliary winding $L_h$. FIG. 2d shows the voltage at the base of the bipolar transistor $T_1$. FIGS. 2e and 2f show the voltage and the current across and through the extra coil $L_b$. FIG. 2g shows the collector current of the bipolar transistor $T_1$.

The rectified mains voltage is approximately 300 V in this embodiment. The flyback voltage is, for example 150 V which is customary for power supplies (SMPS). The polarity of the voltage at the auxiliary winding $L_b$ is reversed with respect to the primary winding $L_p$. Moreover, the number of windings is smaller so that 300 V at the primary winding corresponds to approximately 17 V at the auxiliary winding. The value of 150 V corresponds to approximately 8.8 V. The voltage at the base of the bipolar transistor is substantially 0 when the MOSFET is turned on: 0.7 V of the base-emitter junction plus the forward voltage of the MOSFET. When the MOSFET is turned off, the base voltage is clipped at 12 V via the extra diode. The voltage across the extra coil consists of the difference between the base voltage of the bipolar transistor and the voltage at the auxiliary winding of the transformer.

Figure 3A:
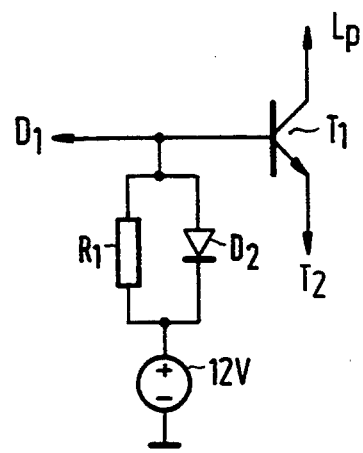
FIGS. 3a and 3b show further embodiments of a power supply circuit according to the invention.
Figure 3B:
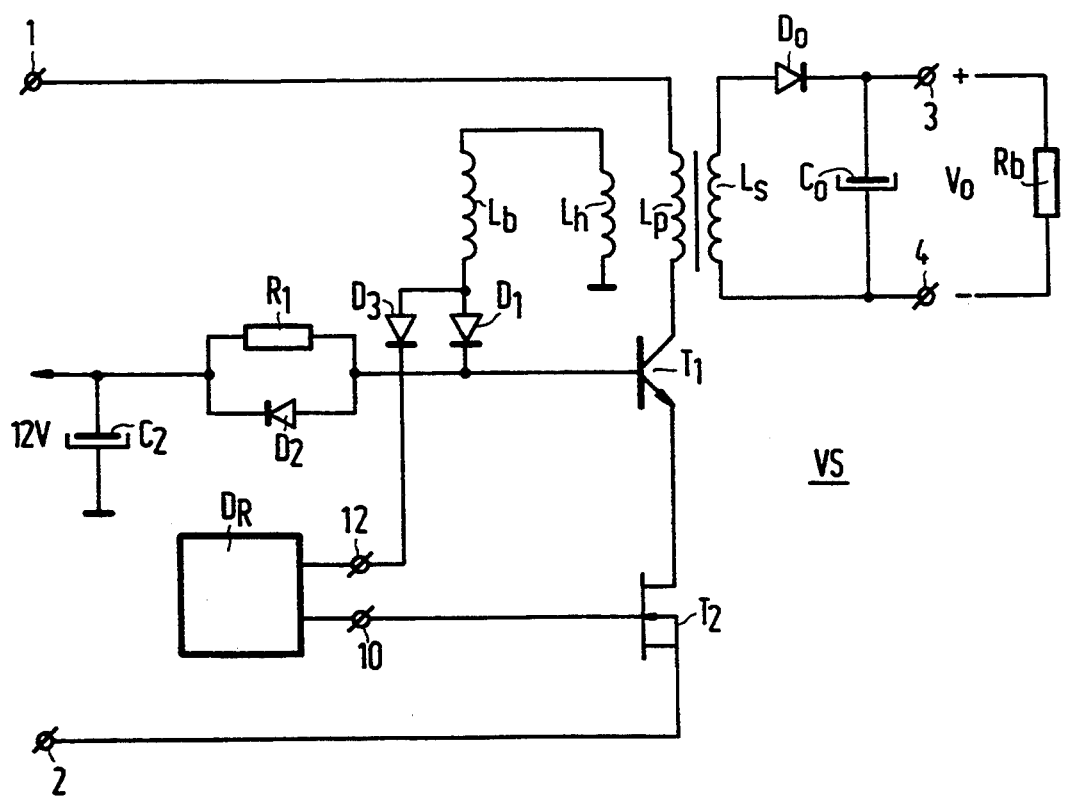

FIGS. 3a and 3b show alternative base drives of the bipolar transistor $T_1$. FIG. 3a shows a part of the power supply circuit in which the parallel arrangement of the zener diode $Z_1$ and the capacitor $C_1$ is replaced by a parallel arrangement of an extra resistor $R_1$ and a diode $D_2$ in series with a voltage source of, for example 12 V. As compared with the power supply circuit shown in FIG. 1, this circuit has the advantage that the base of the bipolar transistor $T_1$ can be maintained more accurately at the correct voltage than with the (expensive) zener diode. In this embodiment (with the voltage source of, for example 12 V) the other side of the extra coil $L_b$ is connected to this voltage source after the bipolar transistor $T_1$ is turned off. Energy is also fed back to this voltage source. In the embodiment shown in FIG. 1 the energy is fed back to the capacitor $C_1$.

FIG. 3b shows another embodiment in which the capacitor $C_2$ operating as a voltage source (of 12 V) is prevented from being overloaded with the switch-off current when the cascode circuit is turned off. In fact, this would cause an increase of the voltage across the capacitor (voltage source) so that the voltage will increase also at other loads connected to the same voltage source. In the embodiment of FIG. 3b this is solved by connecting an extra diode $D_3$ to the junction point of the extra coil $L_b$ and the diode $D_1$, which diode $D_3$ has its other terminal connected to an input 12 of the drive circuit $D_R$ and furnishes a switch-off signal for the MOSFET $T_2$, while simultaneously the input terminal 12 (of the drive circuit) is connected to ground in the drive circuit via a switch so that the current from the extra coil $L_b$ can flow to ground via the diode $D_3$ and cannot increase the voltage across the capacitor $C_2$ (voltage source).

It will be evident that combinations of the above-mentioned embodiments are possible and that further different alternatives are possible without departing from the scope of the invention. For example, the bipolar npn transistor shown in the embodiments may be replaced by a bipolar pnp transistor. The MOSFET (field effect transistor) may alternatively be implemented as a p-channel or an n-channel MOSFET.

We claim:

1. A power supply circuit comprising
   input terminals for receiving an input voltage,
   output terminals for supplying an output voltage,
   a cascode circuit including a bipolar transistor having a base and a MOS field effect transistor having a gate,
   a proportional drive for driving the base of the bipolar transistor,
   a drive circuit for driving the gate of the MOS field effect transistor, characterized in that the power supply circuit further includes a transformer having a primary winding arranged in series with the cascode circuit and the proportional drive comprises an auxiliary winding which is coupled to the primary winding, an inductance coupled to the base of the bipolar transistor being arranged in series with the auxiliary winding.

2. The power supply circuit as claimed in claim 1, further including a diode for coupling the series arrangement of the auxiliary winding and the inductance to the base of the bipolar transistor.

3. The power supply circuit as claimed in claim 2, characterized in that the base of the bipolar transistor is coupled to ground via a parallel arrangement of a resistor and a diode in series with a voltage source.

4. The power supply circuit as claimed in claim 3, further including a second diode coupled to an input terminal of the drive circuit and to the junction point of the inductance and the diode, said drive circuit for coupling said input terminal to ground when the MOS field effect transistor is turned off.

5. The power supply circuit as claimed in claim 1, further including a zener diode and a capacitor coupled in parallel for coupling the base of the bipolar transistor to ground.

6. A power supply circuit, comprising:

first and second input terminals coupled to receive an input voltage;

output terminals for supplying an output voltage;

a transformer having a primary winding and a secondary winding coupled to the output terminals for supplying the output voltage;

a series arrangement of a bipolar transistor and a MOS field effect transistor having a source and a drain, the bipolar transistor having (i) a collector coupled to said first input terminal through said primary winding, (ii) an emitter coupled to the drain of the MOS field effect transistor, and (iii) a base, the source of the MOSFET being coupled to the second input terminal;

a proportional drive for driving said base and including in series, an auxiliary winding of said transformer and an inductance coupled to said base; and driving means for controlling said MOS field effect transistor.

* * * * *